| (12) | United States Patent | (10) Patent No.: | US 8,776,852 B2 |
|---|---|---|---|
| | Tokizaki | (45) Date of Patent: | Jul. 15, 2014 |

(54) PNEUMATIC TIRE AND VULCANIZATION MOLD FOR THE SAME

(75) Inventor: Hiroshi Tokizaki, Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 301 days.

(21) Appl. No.: 13/196,147

(22) Filed: Aug. 2, 2011

(65) Prior Publication Data

US 2012/0055603 A1 Mar. 8, 2012

(30) Foreign Application Priority Data

Sep. 8, 2010 (JP) .................................. 2010-200595

(51) Int. Cl.
*B60C 13/00* (2006.01)
*B60C 13/02* (2006.01)

(52) U.S. Cl.
USPC ......................................................... 152/523

(58) Field of Classification Search
None
See application file for complete search history.

(56) References Cited

U.S. PATENT DOCUMENTS

| D639,727 S | 6/2011 | Tokizaki | |
|---|---|---|---|
| 2008/0066846 A1* | 3/2008 | Metz | 152/523 |

FOREIGN PATENT DOCUMENTS

| JP | H11-201228 A | 7/1999 |
|---|---|---|
| JP | 2007-320469 | * 12/2007 |

\* cited by examiner

*Primary Examiner* — Justin Fischer
(74) *Attorney, Agent, or Firm* — Global IP Counselors, LLP (57) ABSTRACT

A pneumatic tire including a decorative portion having at least one ridge group that extends band-like in the tire circumferential direction on the outer surface of the side wall. Each of the ridge groups is formed from a bundle of ridges. An entirety of each of the ridge groups is formed into a wave-like shape that extends in the tire circumferential direction, and each of the ridge groups is arranged so as to mutually cross at a plurality of locations in the tire circumferential direction. Therefore, the decorative portion is noticeable, and the decoratability of the tire can be enhanced.

17 Claims, 10 Drawing Sheets

|  | Working Example 1 | Working Example 2 | Working Example 3 | Comparative Example 1 | Comparative Example 2 |
|---|---|---|---|---|---|
| FIG. Number | FIG. 7 | FIG. 8 | FIG. 9 | FIG. 10 | FIG. 11 |
| Three-dimensional appearance | 115 | 110 | 105 | 95 | 95 |
| Degree of decoratability | 115 | 110 | 105 | - | 95 |

FIG. 12

PNEUMATIC TIRE AND VULCANIZATION MOLD FOR THE SAME

CROSS-REFERENCE TO RELATED APPLICATION

This application claims priority to Japanese Patent Application No. JP2010-200595, filed on Sep. 8, 2010. The entire disclosure of Japanese Patent Application No. P2010-200595 is hereby incorporated herein by reference.

BACKGROUND

1. Field of the Invention

The present invention relates to a pneumatic tire. More particularly, the present invention relates to a pneumatic tire having a modified decorative portion, and a vulcanization mold for making the same.

2. Background Information

Pneumatic tires provided with a decorative band formed from a plurality of ridges extending in a tire radial direction on an outer surface of a side wall are conventionally used on four-wheel vehicles such as cars, trucks, buses and so on as described, for example, in Japanese Unexamined Patent Application No. H11-201228A. Conventionally, when forming the outer surface of the side wall to be planar, minor recesses and protrusions formed in the outer surface of the side wall due to the presence of a folded end portion of a carcass are noticeable. One purpose of providing the decorative band formed by the plurality of ridges is to make these recesses and protrusions unnoticeable.

However, with such a pneumatic tire, the plurality of ridges extending in the tire radial direction is only systematically disposed at equal intervals in a tire circumferential direction. Therefore, there are cases where the recesses and protrusions generated on the outer surface of the side wall are noticeable and there is a demand to make the recesses and protrusions unnoticeable. Additionally, in recent years, demands for making the decorative band on the outer surface of the side wall more noticeable for the purpose of enhancing the decoratability of the tire have been growing.

SUMMARY

In view of the above, an object of the present invention is to provide a pneumatic tire and a vulcanization mold for the same in which recesses and protrusions generated in the outer surface of the side wall can be made unnoticeable and, furthermore, decoratability of the tire can be enhanced.

Accordingly, a disclosed embodiment provides a pneumatic tire including a decorative portion extending band-like in a tire circumferential direction on an outer surface of a side wall. In this type of pneumatic tire, a plurality of ridge groups is provided in a decorative portion, and each of the ridge groups includes a bundle of a plurality of ridges. Additionally, a first section, wherein the bundle of ridges extends from an inner side to an outer side in a tire radial direction from a first side toward a second side in the tire circumferential direction, and a second section, wherein the bundle of ridges extends from the outer side to the inner side in the tire radial direction from the first side toward the second side in the tire circumferential direction, are alternately disposed in the tire circumferential direction, thereby forming an entirety of each of the ridge groups into a wave-like shape that extends in the tire circumferential direction. The ridge groups are arranged so as to mutually cross at a plurality of locations in the tire circumferential direction, and each of the crossing portions where the ridge groups cross is arranged so that the first section of a certain ridge group crosses the second section of another ridge group, and the second section of the certain ridge group crosses the first section of the other ridge group.

Thus, the plurality of ridge groups is provided in the decorative portion that extends band-like in the tire circumferential direction on the outer surface of the side wall; each of the ridge groups is formed from the bundle of ridges; an entirety of each of the ridge groups is formed into a wave-like shape that extends in the tire circumferential direction; and the ridge groups are arranged so as to mutually cross at a plurality of locations in the tire circumferential direction. Therefore, compared to cases where the plurality of ridges extending in the tire radial direction in the decorative portion is systematically disposed at equal intervals in the tire circumferential direction, the decorative portion is noticeable.

Additionally, another embodiment provides a pneumatic tire including a decorative portion extending band-like in a tire circumferential direction on an outer surface of a side wall. In this type of pneumatic tire, a first ridge group including a bundle of a plurality of ridges and a second ridge group including a bundle of a plurality of ridges are provided in the decorative portion. A first section of a first ridge, wherein the bundle of ridges extends from an inner side to an outer side in a tire radial direction from a first side toward a second side in the tire circumferential direction, and a second section of the first ridge, wherein the bundle of ridges extends from the outer side to the inner side in the tire radial direction from the first side toward the second side in the tire circumferential direction, are alternately disposed in the tire circumferential direction, thereby forming the first ridge group into a wave-like shape that extends in the tire circumferential direction. A first section of a second ridge, wherein the bundle of ridges extends from an inner side to an outer side in a tire radial direction from a first side toward a second side in the tire circumferential direction, and a second section of the second ridge, wherein the bundle of ridges extends from the outer side to the inner side in the tire radial direction from the first side toward the second side in the tire circumferential direction, are alternately disposed in the tire circumferential direction, thereby forming the second ridge group into a wave-like shape that extends in the tire circumferential direction. The first section of the first ridge and the second section of the second ridge are arranged so as to cross at a plurality of locations in the tire circumferential direction, and the second section of the first ridge and the first section of the second ridge are arranged so as to cross at a plurality of locations in the tire circumferential direction.

Thus, the first and second ridge groups are provided in the decorative portion that extends band-like in the tire circumferential direction on the outer surface of the side wall; each of the ridge groups is formed from the bundle of ridges; an entirety of each of the ridge groups is formed into a wave-like shape that extends in the tire circumferential direction; and the ridge groups are arranged so as to mutually cross at a plurality of locations in the tire circumferential direction. Therefore, compared to cases where the plurality of ridges extending in the tire radial direction in the decorative portion is systematically disposed at equal intervals in the tire circumferential direction, the decorative portion is noticeable.

Moreover, the present technology provides a pneumatic tire including a decorative portion extending band-like in a tire circumferential direction on an outer surface of a side wall. In this type of pneumatic tire, a ridge group including a bundle of a plurality of ridges is provided in the decorative portion. A first section, wherein the bundle of ridges extends from an inner side to an outer side in a tire radial direction from a first side toward a second side in the tire circumferential direction, and a second section, wherein the bundle of ridges extends from the outer side to the inner side in the tire radial direction from the first side toward the second side in the tire circumferential direction, are alternately disposed in the tire circumferential direction, thereby forming an entirety of the ridge group into a wave-like shape that extends in the tire circumferential direction. A mutual interval between each of the ridges that constitute the first section of the ridge group is formed so as to gradually widen and then narrow from the first side toward the second side in the tire circumferential direction, and the mutual interval between each of the ridges constituting the second section of the ridge group is also formed so as to gradually widen and then narrow from the first side toward the second side in the tire circumferential direction.

Thus, the ridge group is provided in the decorative portion that extends band-like in the tire circumferential direction on an outer surface of a side wall; the ridge group is formed from the bundle of ridges; an entirety of the ridge group is formed into a wave-like shape that extends in the tire circumferential direction; and the mutual interval between each of the ridges that constitute the first section and the second section of the ridge group is formed so as to gradually widen and then narrow from the first side toward the second side in the tire circumferential direction. Therefore, when, for example, the ridge group is viewed from the front (the tire axial direction), a visual effect is produced in which portions where the intervals are wide of each of the ridges appear to be in front of portions where the intervals are narrow, and the ridge group appears to be three-dimensional. As a result, compared to cases where the plurality of ridges extending in the tire radial direction in the decorative portion is systematically disposed at equal intervals in the tire circumferential direction, the decorative portion is noticeable.

According to the pneumatic tire of the disclosed embodiments, compared to cases where a plurality of ridges extending in the tire radial direction is provided throughout an entirety of the decorative portion and each of the ridges is systematically disposed at an equal interval in the tire circumferential direction, the decorative portion is more noticeable. Therefore, recesses and protrusions generated on the outer surface of the side wall can be made unnoticeable and, furthermore, the decoratability of the tire can be enhanced.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A pneumatic tire according to a first embodiment will be described below with reference to FIGS. 1 to 3. This pneumatic tire can be mounted on a vehicle such as a four-wheel car, truck, bus, or the like.

Figure 1:
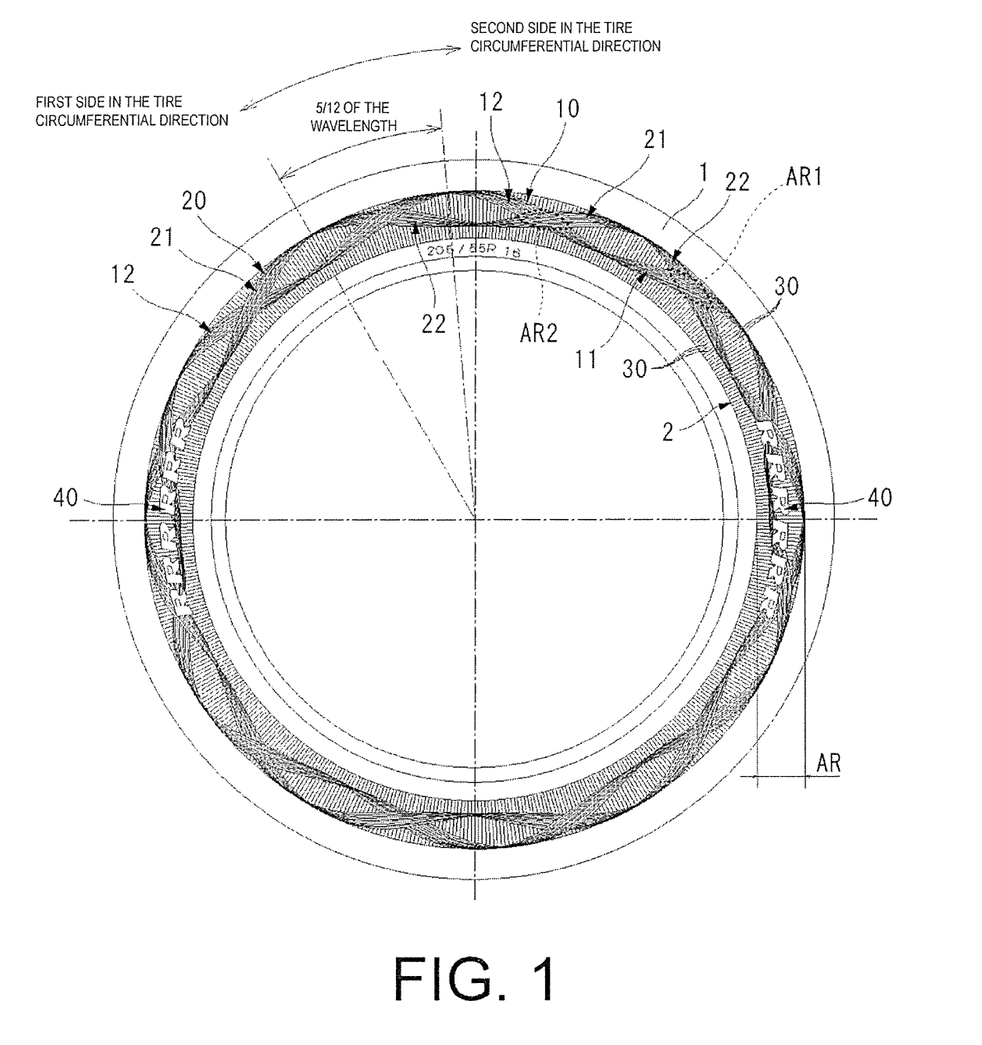
FIG. 1 is a front view of a pneumatic tire according to a first disclosed embodiment.
Figure 2:
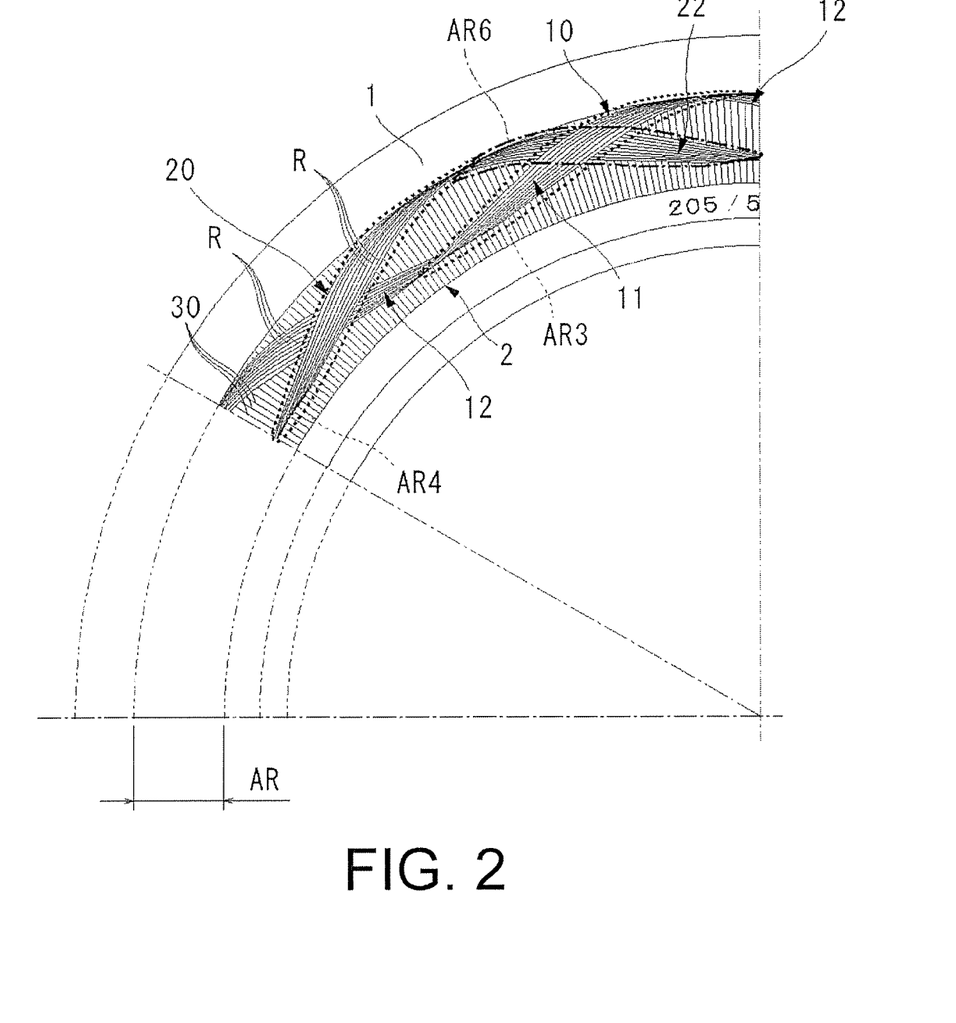
FIG. 2 is a detailed front view of the pneumatic tire shown in FIG. 1.

As illustrated in FIGS. 1 and 2, the pneumatic tire is provided with a band-like decorative portion 2 along an entire circumference of a predetermined range AR in a tire radial direction on an outer surface of a side wall 1. The decorative portion 2 is provided with a first ridge group 10 including a bundle of a plurality of ridges R and a second ridge group 20 including a bundle of a plurality of the ridges R. Additionally, a plurality of radial direction ridges 30 that extend in the tire radial direction is provided in each portion other than the first and second ridge groups 10 and 20 in the decorative portion 2, and each of the radial direction ridges 30 is disposed so as to be arranged mutually substantially parallel (e.g., 1° or less) with an adjacent ridge. Moreover, a display portion 40 where marks are displayed via letters/numbers and/or emblems is provided in two locations in the circumferential direction, and the letter/numbers and the like of the display portions 40 are provided so as to protrude from a surface of the side wall 1. Note that recesses and protrusions corresponding with the first ridge group 10, the second ridge group 20, the plurality of radial direction ridges 30, and each of the display portions 40 are provided in a cavity of a vulcanization mold for vulcanization molding the tire. The first ridge group 10, the second ridge group 20, the plurality of radial direction ridges 30, and each of the display portions 40 are molded into an outer surface of the side wall 1 by these recesses and protrusions.

The first ridge group 10 is formed from the bundle of the plurality of ridges R (ten ridges in this embodiment). Additionally, a first section 11 of the first ridge group 10, wherein the bundle of the plurality of ridges R extends from an inner side to an outer side in a tire radial direction from a first side toward a second side in the tire circumferential direction, and a second section 12 of the first ridge group 10, wherein the bundle of the plurality of ridges R extends from the outer side to the inner side in the tire radial direction from the first side toward the second side in the tire circumferential direction, are alternately disposed in the tire circumferential direction, thereby forming the first ridge group 10 into a wave-like shape that extends in the tire circumferential direction. Additionally, in this embodiment, the first ridge group 10 has six waves along a circumference of the tire, and each of the waves is shaped mutually the same. Therefore, a wavelength of each of the waves is ⅙ the length of the circumference of the tire.

The second ridge group 20 is formed from a bundle of the plurality of ridges R (ten ridges in this embodiment). Additionally, a first section 21 of the second ridge group 20, wherein the bundle of the plurality of ridges R extends from an inner side toward an outer side in a tire radial direction from a first side toward a second side in the tire circumferential direction, and a second section 22 of the second ridge group 20, wherein the bundle of the plurality of ridges R extends from the outer side to the inner side in the tire radial direction from the first side toward the second side in the tire circumferential direction, are alternately disposed in the tire circumferential direction, thereby forming the second ridge group 20 into a wave-like shape that extends in the tire circumferential direction. Additionally, in this embodiment, the second ridge group 20 has six waves along a circumference of the tire, and each of the waves is shaped mutually the same. Therefore, a wavelength of each of the waves is ⅙ the length of the circumference of the tire. Moreover, in this embodiment, the shape of the second ridge group 20 is the same as that of the first ridge group 10, and the second ridge group 20 is disposed so that a relative position thereof is offset just 5/12 of the wavelength of the first ridge group 10 in the tire circumferential direction from the first ridge group 10. The ridges R of each of the ridge groups 10 and 20 have, for example, a width of approximately from 0.3 to 0.1 mm and a height of approximately from 0.1 to 0.5 mm.

Additionally, the first section 11 of the first ridge group 10 of the first ridge group 10 and the second section 22 of the second ridge group 20 of the second ridge group 20 cross at a plurality of locations in the tire circumferential direction; and the second section 12 of the first ridge group 10 of the first ridge group 10 and the first section 21 of the second ridge group 20 of the second ridge group 20 cross at a plurality of locations in the tire circumferential direction.

Furthermore, each of the crossing portions where the ridge groups 10 and 20 cross is arranged so that the ridges R of the second section 22 of the second ridge group 20 are divided in an extending direction thereof by the first section 11 of the first ridge group 10 (see range AR1 in FIG. 1), and the ridges R of the second section 12 of the first ridge group 10 are divided in an extending direction thereof by the first section 21 of the second ridge group 20 (see range AR2 in FIG. 1).

Figure 3:
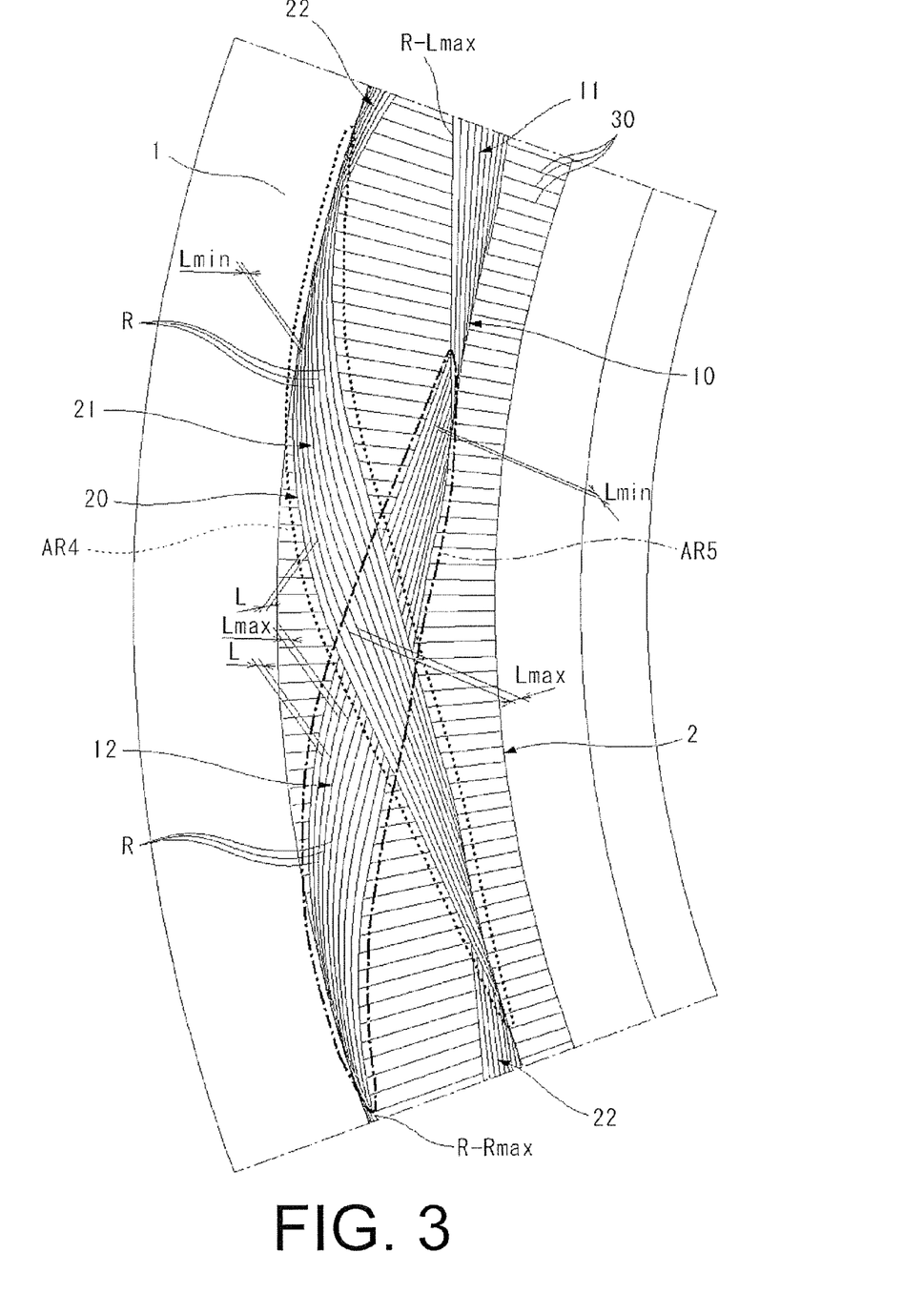
FIG. 3 is a further detailed front view of the pneumatic tire shown in FIG. 1.

Additionally, as illustrated in FIG. 3, the second section 12 of the first ridge group 10 is provided between a ridge R-Lmax, disposed most to the first side in the tire circumferential direction, of the ridges R of the first section 11 of the first ridge group 10 that is disposed nearest to the second side in the tire circumferential direction with respect to the second section 12; and a ridge R-Rmax, disposed most to the second side in the tire circumferential direction, of the ridges of the first section 11 of the first ridge group 10 that is disposed nearest to the first side in the tire circumferential direction with respect to the second section 12.

Additionally, as in the case of the first ridge group 10, the second section 22 of the second ridge group 20 is also provided between a ridge R, disposed most to the second side in the tire circumferential direction, of the ridges R of the first section 21 of the second ridge group 20 that is disposed nearest to the second side in the tire circumferential direction with respect to the second section 22; and a ridge R, disposed most to the second side in the tire circumferential direction, of the ridges R of the first section 21 of the second ridge group 20 that is disposed nearest to the first side in the tire circumferential direction with respect to the second section 22.

A mutual interval L between each of the ridges R that constitute each of the first sections 11 of the first ridge group 10 and each of the first sections 21 of the second ridge group 20 is formed so as to gradually widen and then narrow from the first side toward the second side in the tire circumferential direction, and the mutual interval L between each of the ridges R constituting each of the second sections 12 of the first ridge group 10 and each of the second sections 22 of the second ridge group 20 is also formed so as to gradually widen and then narrow from the first side toward the second side in the tire circumferential direction (see ranges AR3 to AR6 in FIGS. 2 and 3). In this embodiment, the interval L between each of the ridge sections 11, 12, 21, and 22 is configured so that an interval Lmax of a largest section is 1.2 times or greater than an interval Lmin of a smallest section (see FIG. 3). Note that while it is preferable that this multiplier be 1.2 times or greater, the effects described below are shown even at a multiplier of approximately 1.1 times. Also, the larger this multiplier, the more preferable.

Thus, according to this embodiment, the first and second ridge groups 10 and 20 are provided in the decorative portion 2 that extends band-like in the tire circumferential direction on the outer surface of the side wall 1; each of the ridge groups 10 and 20 is formed from the bundle of ridges R; an entirety of each of the ridge groups 10 and 20 is formed into a wave-like shape that extends in the tire circumferential direction; and the ridge groups 10 and 20 are arranged so as to mutually cross at a plurality of locations in the tire circumferential direction. Therefore, compared to cases where a plurality of ridges 30 extending in the tire radial direction is provided throughout an entirety of the decorative portion 2 and each of the ridges 30 is systematically disposed at an equal interval in the tire circumferential direction, the decorative portion 2 is noticeable. Thus, the decorative portion 2 can be made noticeable and, therefore, recesses and protrusions generated in the outer surface of the side wall 1 due to the presence of the folded end portion of the carcass can be made unnoticeable and, furthermore, decoratability of the tire can be enhanced.

Additionally, the mutual interval L between each of the ridges R that constitute each of the first sections 11 of the first ridge group 10 and each of the first sections 21 of the second ridge group 20 gradually widens and then narrows from the first side toward the second side in the tire circumferential direction, and the mutual interval L between each of the ridges R constituting each of the second sections 12 of the first ridge group 10 and each of the second sections 22 of the second ridge group 20 also gradually widens and then narrows from the first side toward the second side in the tire circumferential direction. In addition to this configuration, an entirety of each of the ridge groups 10 and 20 is formed into a wave-like shape that extends in the tire circumferential direction. Therefore, when, for example, the ridge groups 10 and 20 are viewed from the front (the tire axial direction), a visual effect is produced in which portions where the interval L is wide between each of the ridges R appear to be in front of portions where the interval L is narrow, each of the ridge groups 10 and 20 appear to be three-dimensional, and the decorative portion 2 can be made even more noticeable.

Furthermore, each of the crossing portions where the ridge groups 10 and 20 cross is arranged so that the ridges R of the second section 22 of the second ridge group 20 are divided in an extending direction thereof by the first section 11 of the first ridge group 10 (see range AR1 in FIG. 1), and the ridges R of the second section 12 of the first ridge group 10 are divided in an extending direction thereof by the first section 21 of the second ridge group 20 (see range AR2 in FIG. 1). In addition to this configuration, an entirety of each of the ridge groups 10 and 20 is formed into a wave-like shape that extends in the tire circumferential direction. Therefore, when the ridge groups 10 and 20 are viewed, a visual effect is produced in which the ridge groups 10 and 20 appear to be intertwined, each of the ridge groups 10 and 20 appear to be three-dimensional, and the decorative portion 2 can be made even more noticeable. Additionally, according to this configuration, each of the ridges R of the first ridge group 10 will not individually cross each of the ridges R of the second ridge group 20. In contrast, in cases where the divided configuration described above is not used and each of the ridges R of the first ridge group 10 individually cross each of the ridges R of the second ridge group 20, a plurality of fine protrusions corresponding to portions of the vulcanization mold will be provided, which will lead to a decline in the durability of the vulcanization mold. However, because each of the ridges R of the first ridge group 10 will not individually cross each of the ridges R of the second ridge group 20, it is possible to enhance the durability of the vulcanization mold.

Additionally, as illustrated in FIG. 3, the second section 12 of the first ridge group 10 is provided between a ridge R-Lmax, disposed most to the first side in the tire circumferential direction, of the ridges R of the first section 11 of the first ridge group 10 that is disposed nearest to the second side in the tire circumferential direction with respect to the second section 12; and a ridge R-Rmax, disposed most to the second side in the tire circumferential direction, of the ridges of the first section 11 of the first ridge group 10 that is disposed nearest to the first side in the tire circumferential direction with respect to the second section 12. Additionally, as in the case of the first ridge group 10, the second section 22 of the second ridge group 20 is also provided between a ridge R, disposed most to the second side in the tire circumferential direction, of the ridges R of the first section 21 of the second ridge group 20 that is disposed nearest to the second side in the tire circumferential direction with respect to the second section 22; and a ridge R, disposed most to the second side in the tire circumferential direction, of the ridges R of the first section 21 of the second ridge group 20 that is disposed nearest to the first side in the tire circumferential direction with respect to the second section 22. In addition to this configuration, an entirety of each of the ridge groups 10 and 20 is formed into a wave-like shape that extends in the tire circumferential direction. Therefore, a visual effect is produced in which the first sections 11 and 21 of the ridge groups 10 and 20 appear to be in front of the second sections 12 and 22, each of the ridge groups 10 and 20 appear to be three-dimensional, and the decorative portion 2 can be made even more noticeable.

Additionally, the wave-like shape of the first ridge group 10 and the wave-like shape of the second ridge group 20 have the same wavelength in the tire circumferential direction, and the second ridge group 20 is disposed so that a relative position thereof is offset just 5/12 of the wavelength of the first ridge group 10 in the tire circumferential direction from the first ridge group 10. Therefore, compared to cases where the second ridge group 20 is offset just ½ of the wavelength in the tire circumferential direction from the first ridge group 10, the visual effect in which the first ridge group 10 and the second ridge group 20 appear to be intertwined is more prominently displayed, each of the ridge groups 10 and 20 appear to be more three-dimensional, and the decorative portion 2 can be made even more noticeable. In this embodiment, a configuration is described in which the second ridge group 20 is disposed so that a relative position thereof is offset just 5/12 of the wavelength of the first ridge group 10 in the tire circumferential direction from the first ridge group 10. However, the visual effect in which the first ridge group 10 and the second ridge group 20 appear to be intertwined is prominently displayed by disposing the second ridge group 20 so that a relative position thereof is offset in the tire circumferential direction not less than 1/12 and not more than 5/12 of the wavelength of the first ridge group 10 from the first ridge group 10. The effect can be displayed even more prominently by disposing the second ridge group 20 so that the relative position thereof is offset in the tire circumferential direction not less than 1/6 and not more than 1/3 of the wavelength of the first ridge group 10 from the first ridge group 10.

In the first embodiment, a configuration is described in which the first ridge group 10 includes a bundle of ten of the ridges R, and the second ridge group 20 also includes a bundle of ten of the ridges R. However, it is possible to attain the same functionality/effectiveness as described above even in cases where, for example, the second ridge group 20 includes a bundle of 5, 15, or 25 of the ridges R.

In the first embodiment, a configuration is described in which the second ridge group 20 is disposed so that a relative position thereof is offset in the tire circumferential direction just 5/12 of the wavelength of the first ridge group 10 from the first ridge group 10. However, it is also possible to dispose the second ridge group 20 so that a relative position thereof is offset in the tire circumferential direction just ½ of the wavelength of the first ridge group 10 from the first ridge group 10.

Additionally, in the first embodiment, a configuration is described in which the wave-like shape of the first ridge group 10 and the wave-like shape of the second ridge group 20 have the same wavelength in the tire circumferential direction. However, it is possible to provide the wave-like shape of the second ridge group 20 with an amplitude that is greater than that of the first ridge group 10. In this case, it is also possible to attain the same functionality/effectiveness as described above.

Figure 4:
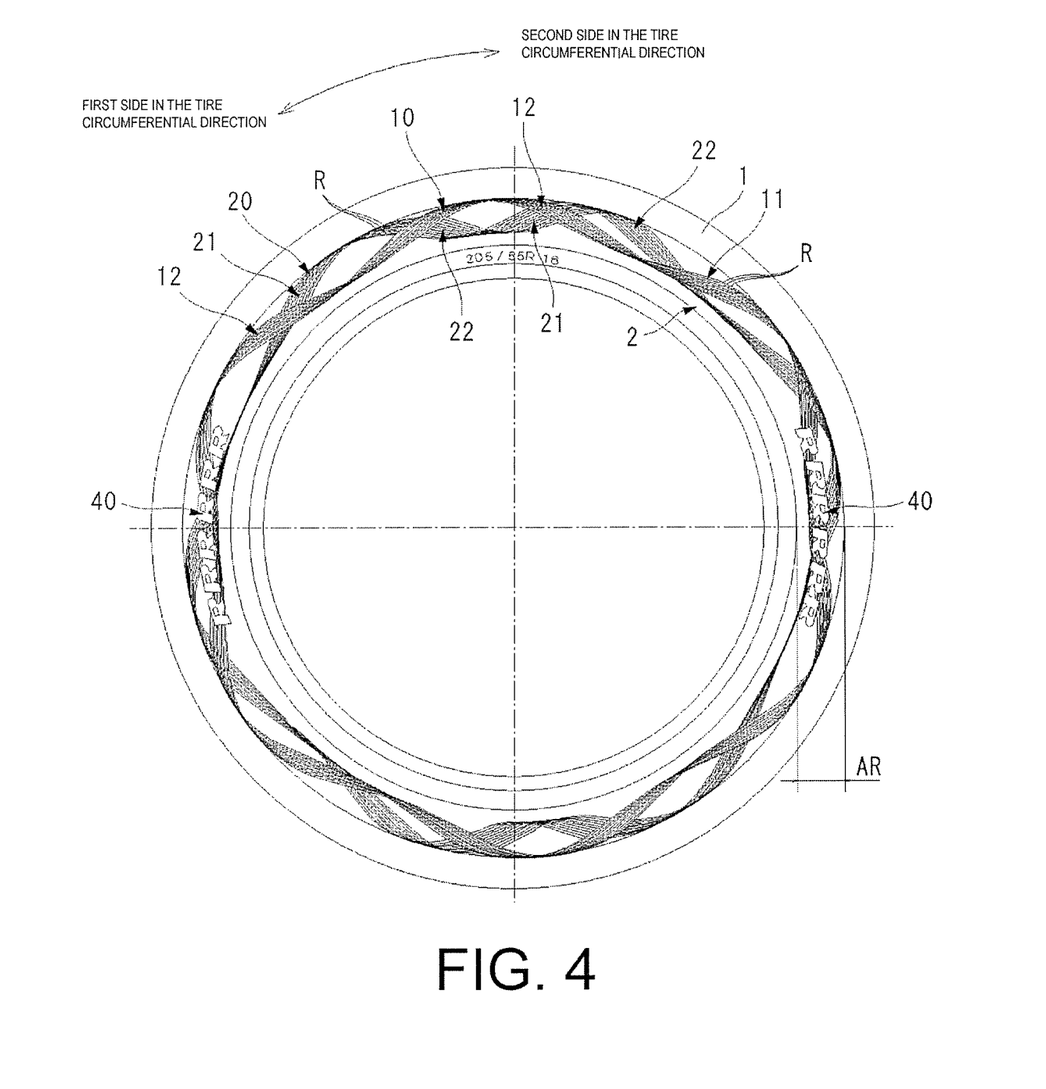
FIG. 4 is a front view illustrating a modified example of the pneumatic tire shown in FIG. 1.

Also, in the first embodiment, a configuration is described in which the second ridge group 20 has a wave-like shape that is the same as that of the first ridge group 10 and that mutual wavelengths thereof in the tire circumferential direction are formed from six equivalent waves. However, as illustrated in FIG. 4, for example, it is possible to form the second ridge group 20 into a wave-like shape wherein the wavelength in the tire circumferential direction is formed from six waves of three types. In this case, it is also possible to attain the same functionality/effectiveness as described above. Note that the radial direction ridges 30 are not illustrated in FIG. 4, but the radial direction ridges 30 can be provided, as desired. Additionally, in FIG. 4, the configuration is not used in which the second section 12 of the first ridge group 10 and the second section 22 of the second ridge group 20 are provided between the ridge R, disposed most to the second side in the tire circumferential direction, of the ridges R of the first sections 11 and 21 that is disposed nearest to the second side in the tire circumferential direction with respect to the second sections 12 and 22; and the ridge R, disposed most to the second side in the tire circumferential direction, of the ridges R of the first sections 11 and 21 that is disposed nearest to the first side in the tire circumferential direction with respect to the second sections 12 and 22. It is possible to also form the first ridge group 10 into a wave-like shape wherein the wavelength in the tire circumferential direction is formed from a plurality of waves of a plurality of types.

Furthermore, in FIG. 4, each of the crossing portions where the ridge groups 10 and 20 cross is arranged so that the ridges R of the second section 22 of the second ridge group 20 are divided in an extending direction thereof by the first section 11 of the first ridge group 10, and the ridges R of the first section 21 of the second ridge group 20 are divided in an extending direction thereof by the second section 12 of the first ridge group 10. Therefore, a visual effect is produced in which the first ridge group 10 appears to be in front of the second ridge group 20, the ridge groups 10 and 20 appear to be three-dimensional, and the decorative portion 2 can be made even more noticeable.

In the first embodiment, a configuration is described in which each of the ridge groups 10 and 20 have six waves along a circumference of the tire, each of the waves is shaped mutually the same, and the wavelength of each of the waves is ⅙ of the circumference of the tire. However, effectiveness equal to that described above is shown prominently when the wavelength of each of the waves is in a range of not less than 1/14 and not more than ⅕ of the circumference of the tire. Furthermore, effectiveness equal to that described above is shown even more prominently when the wavelength of each of the waves is in a range of not less than 1/12 and not more than ⅙ of the circumference of the tire.

Figure 5:
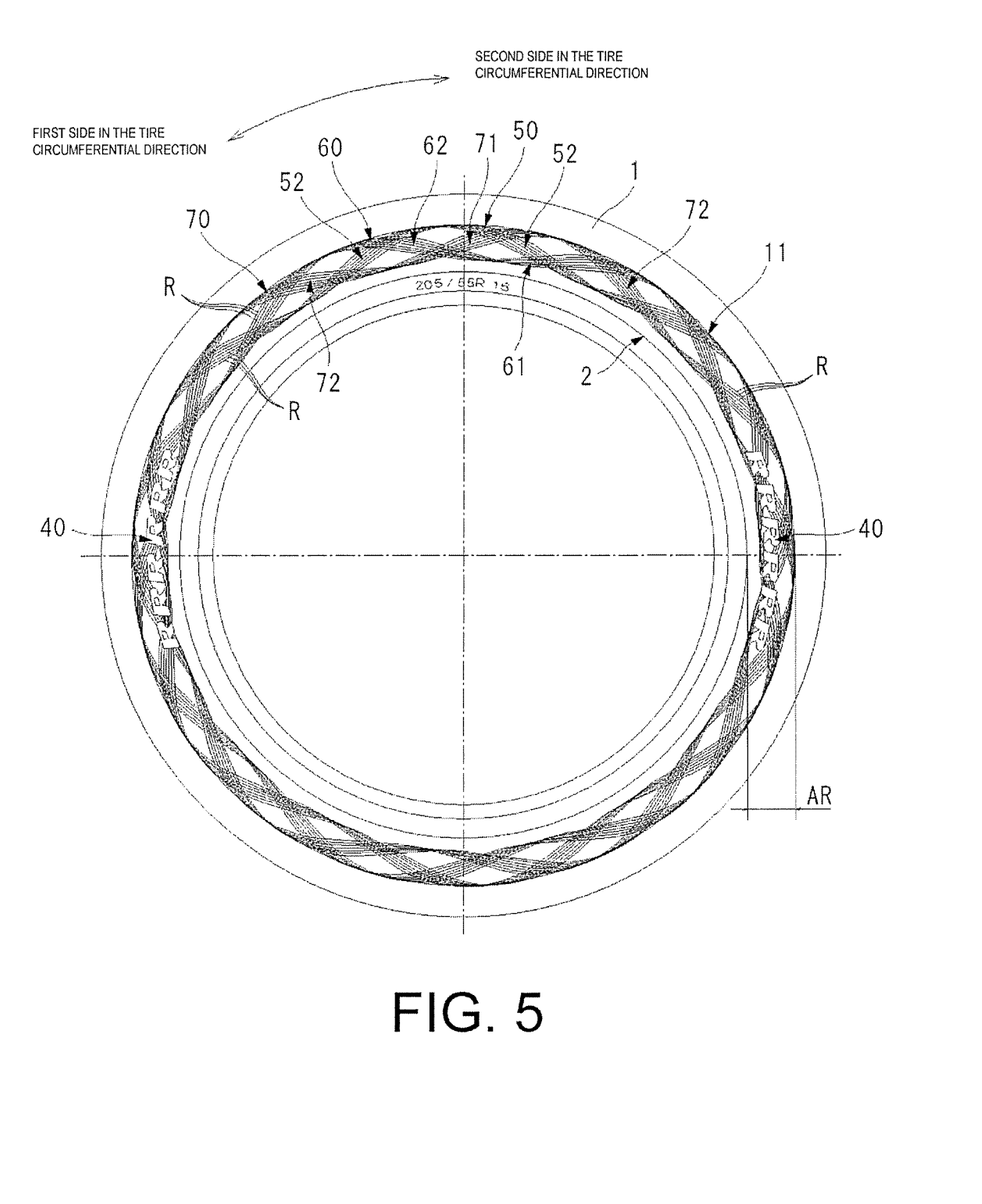
FIG. 5 is a front view of a pneumatic tire according to a second disclosed embodiment.

A pneumatic tire of a second embodiment of the present technology will be described below with reference to FIG. 5. This pneumatic tire is a pneumatic tire wherein the configuration of the decorative portion 2 of the first embodiment is modified. The decorative portion 2 of the second embodiment is provided with a first ridge group 50 including a bundle of a plurality of ridges, a second ridge group 60 including a bundle of a plurality of the ridges, and a third ridge group 70 including a bundle of a plurality of the ridges. Though not shown in the drawings, just as in the first embodiment, a plurality of radial direction ridges that each extend in the tire radial direction is provided in each portion other than the first, second, and third ridge groups 50, 60, and 70 in the decorative portion 2. Moreover, a display portion 40 where marks are displayed via letters/numbers and/or emblems is provided in two locations in the circumferential direction, and the letter/numbers and the like of the display portions 40 are provided so as to protrude from a surface of the side wall 1. Note that recesses and protrusions corresponding with the first ridge group 50, the second ridge group 60, the third ridge group 70, the plurality of radial direction ridges, and each of the display portions 40 are provided in a cavity of a vulcanization mold for vulcanization molding the tire. The first ridge group 50, the second ridge group 60, the third ridge group 70, the plurality of radial direction ridges, and each of the display portions 40 are molded into an outer surface of the side wall 1 by these recesses and protrusions.

The first ridge group 50 is formed from the bundle of the plurality of ridges R (seven ridges in this embodiment). Additionally, a first section 51 of the first ridge group 50, wherein the bundle of the plurality of ridges R extends from an inner side to an outer side in a tire radial direction from a first side toward a second side in the tire circumferential direction, and a second section 52 of the first ridge group 50, wherein the bundle of the plurality of ridges R extends from the outer side to the inner side in the tire radial direction from the first side toward the second side in the tire circumferential direction, are alternately disposed in the tire circumferential direction, thereby forming the first ridge group 50 into a wave-like shape that extends in the tire circumferential direction. Additionally, in this embodiment, the first ridge group 50 has six waves along a circumference of the tire, and each of the waves is shaped mutually the same. Therefore, a wavelength of each of the waves is ⅙ the length of the circumference of the tire.

The second ridge group 60 is formed from a bundle of the plurality of ridges R (seven ridges in this embodiment). Additionally, a first section 61 of the second ridge group 60, wherein the bundle of the plurality of ridges R extends from an inner side toward an outer side in a tire radial direction from a first side toward a second side in the tire circumferential direction, and a second section 62 of the second ridge group 60, wherein the bundle of the plurality of ridges R extends from the outer side to the inner side in the tire radial direction from the first side toward the second side in the tire circumferential direction, are alternately disposed in the tire circumferential direction, thereby forming the second ridge group 60 into a wave-like shape that extends in the tire circumferential direction. Additionally, in this embodiment, the second ridge group 60 has six waves along a circumference of the tire, and each of the waves is shaped mutually the same. Therefore, a wavelength of each of the waves is ⅙ the length of the circumference of the tire. Moreover, in this embodiment, the shape of the second ridge group 60 is the same as that of the first ridge group 50, and the second ridge group 60 is disposed so that a relative position thereof is offset just ⅙ of the wavelength of the first ridge group 50 in the tire circumferential direction from the first ridge group 50.

The third ridge group 70 is formed from a bundle of the plurality of ridges R (seven ridges in this embodiment). Additionally, a first section 71 of the third ridge group 70, wherein the bundle of the plurality of ridges R extends from an inner side toward an outer side in a tire radial direction from a first side toward a second side in the tire circumferential direction; and a second section 72 of the third ridge group 70, wherein the bundle of the plurality of ridges R extends from the outer side to the inner side in the tire radial direction from the first side toward the second side in the tire circumferential direction, are alternately disposed in the tire circumferential direction, thereby forming the third ridge group 70 into a wave-like shape that extends in the tire circumferential direction. Additionally, in this embodiment, the third ridge group 70 has six waves along a circumference of the tire, and each of the waves is shaped mutually the same. Therefore, a wavelength of each of the waves is ⅙ the length of the circumference of the tire. Moreover, in this embodiment, the shape of the third ridge group 70 is the same as that of the first ridge group 50, and the third ridge group 70 is disposed so that a relative position thereof is offset just ⅓ of the wavelength of the first ridge group 50 in the tire circumferential direction from the first ridge group 50.

Additionally, the first section 51 of the first ridge group 50 of the first ridge group 50, the second section 62 of the second ridge group 60, and the second section 72 of the third ridge group 70 cross at a plurality of locations in the tire circumferential direction; the first section 61 of the second ridge group 60 of the second ridge group 60, the second section 72 of the third ridge group 70, and the second section 52 of the first ridge group 50 cross at a plurality of locations in the tire circumferential direction; and the first section 71 of the third ridge group 70 of the third ridge group 70, the second section 52 of the first ridge group 50, and the second section 62 of the second ridge group 60 cross at a plurality of locations in the tire circumferential direction.

Moreover, a mutual interval between each of the ridges R that constitute each of the first sections 51 of the first ridge group 50, each of the second sections 52 of the first ridge group 50, each of the first sections 61 of the second ridge group 60, each of the second sections 62 of the second ridge group 60, each of the first sections 71 of the third ridge group 70, and each of the second sections 72 of the third ridge group 70 is formed so as to gradually widen and then narrow from the first side toward the second side in the tire circumferential direction. In this embodiment, the interval between each of the ridge sections 51, 52, 61, 62, 71, and 72 is configured so that an interval of a largest section is 1.2 times or greater than an interval of a smallest section. The larger this multiplier, the more preferable. Note that while it is preferable that this multiplier be 1.2 times or greater, the effects described below are shown even at a multiplier of approximately 1.1 times. Also, the larger this multiplier, the more preferable.

Thus, according to this embodiment, the decorative portion 2 extending band-like in the tire circumferential direction on the outer surface of the side wall 1 is provided with the plurality of ridge groups 50, 60, and 70, and each of the ridge groups 50, 60, and 70 are respectively formed from a bundle of the plurality of ridges R. Additionally, the first sections 51,

61, and 71, wherein the bundle of ridges R extends from an inner side to an outer side in a tire radial direction from a first side toward a second side in the tire circumferential direction, and the second sections 52, 62, and 72, wherein the bundle of ridges R extends from the outer side to the inner side in the tire radial direction from the first side toward the second side in the tire circumferential direction, are alternately disposed in the tire circumferential direction, thereby forming an entirety of each of the ridge groups 50, 60, and 70 into a wave-like shape that extends in the tire circumferential direction. Additionally, the ridge groups 50, 60, and 70 are arranged so as to mutually cross at a plurality of locations in the tire circumferential direction. The crossing portions where the ridge groups 50, 60, and 70 cross are arranged so that the first section 51 of the first ridge group 50 crosses the second sections 62 and 72 of the other ridge groups 60 and 70, the first section 61 of the second ridge group 60 crosses the second sections 52 and 72 of the other ridge groups 50 and 70, and the first section 71 of the third ridge group 70 crosses the second sections 52 and 62 of the other ridge groups 50 and 60. Therefore, compared to cases where a plurality of ridges extending in the tire radial direction is provided throughout an entirety of the decorative portion 2 and each of the ridges is systematically disposed at equal intervals in the tire circumferential direction, the decorative portion 2 is noticeable. Thus, the decorative portion 2 can be made noticeable and, therefore, recesses and protrusions generated in the outer surface of the side wall 1 due to the presence of the folded end portion of the carcass can be made unnoticeable and, furthermore, decoratability of the tire can be enhanced.

Moreover, a mutual interval between each of the ridges R that constitute each of the first sections 51 of the first ridge group 50, each of the second sections 52 of the first ridge group 50, each of the first sections 61 of the second ridge group 60, each of the second sections 62 of the second ridge group 60, each of the first sections 71 of the third ridge group 70, and each of the second sections 72 of the third ridge group 70 is formed so as to gradually widen and then narrow from the first side toward the second side in the tire circumferential direction. In addition to this configuration, an entirety of each of the ridge groups 50, 60, and 70 is formed into a wave-like shape that extends in the tire circumferential direction. Therefore, when, for example, the ridge groups 50, 60, and 70 are viewed from the front (the tire axial direction), a visual effect is produced in which portions where the interval is wide between each of the ridges R appear to be in front of portions where the interval is narrow, each of the ridge groups 50, 60, and 70 appear to be three-dimensional, and the decorative portion 2 can be made even more noticeable.

Furthermore, each of the crossing portions where the ridge groups 50, 60, and 70 cross can be arranged so that the ridges R of the second sections 62 and 72 of the other ridge groups 60 and 70 are divided in an extending direction thereof by the first section 51 of the first ridge group 50, the ridges R of the second sections 52 and 72 of the other ridge groups 50 and 70 are divided in an extending direction thereof by the first section 61 of the second ridge group 60, and the ridges R of the second sections 52 and 62 of the other ridge groups 50 and 60 are divided in an extending direction thereof by the first section 71 of the third ridge group 70. In this case, an entirety of each of the ridge groups 50, 60 and 70 is formed into a wave-like shape that extends in the tire circumferential direction. Therefore, when the ridge groups 50, 60, and 70 are viewed, a visual effect is produced in which the ridge groups 50, 60, and 70 appear to be intertwined, each of the ridge groups 50, 60, and 70 appear to be three-dimensional, and the decorative portion 2 can be made even more noticeable.

Furthermore, each of the crossing portions where the ridge groups 50, 60, and 70 cross can be arranged so that the ridges R of the first sections 61 and 71 and the second sections 62 and 72 of the other ridge groups 60 and 70 are divided in an extending direction thereof by the first section 51 of the first ridge group 50 and the second section 52 of the first ridge group 50, and the ridges R of the first section 71 and the second section 72 of the third ridge group 70 are divided in an extending direction thereof by the first section 61 and the second section 62 of the second ridge group 60. In this case, in addition to the visual effect in which the first ridge group 50 appears to be in front of the other ridge groups 60 and 70 being produced, a visual effect is produced in which the second ridge group 60 appears to be in front of the third ridge group 70, the ridge groups 50, 60, and 70 appear to be three-dimensional, and the decorative portion 2 can be made even more noticeable. Additionally, according to this configuration, for example, each of the ridges R of the first ridge group 10 will not individually cross each of the ridges R of the other ridge groups 60 and 70. In cases where the divided configuration described above is not used and each of the ridges R of the ridge groups 50, 60, and 70 individually mutually cross, a plurality of fine protrusions corresponding to portions of the vulcanization mold will be provided, which will lead to a decline in the durability of the vulcanization mold. However, because each of the ridges R of the ridge groups 50, 60, and 70 will not individually mutually cross, it is possible to enhance the durability of the vulcanization mold.

Additionally, in this embodiment, as with the first ridge groups 10 and 20 in the first embodiment, it is possible to arrange the ridge groups 50, 60, and 70 so that the second sections 52, 62, and 72 of each of the ridge groups 50, 60, and 70 are provided between a ridge R, disposed most to the first side in the tire circumferential direction, of the ridges R of the first sections 51, 61, and 71 disposed nearest to the second side in the tire circumferential direction with respect to the second sections 52, 62, and 72; and a ridge R, disposed most to the second side in the tire circumferential direction, of the ridges R of the first sections 51, 61, and 71 disposed nearest to the first side in the tire circumferential direction with respect to the second sections 52, 62, and 72. In this case, an entirety of each of the ridge groups 50, 60, and 70 is formed into a wave-like shape that extends in the tire circumferential direction. Therefore, a visual effect is produced in which the first sections 51, 61, and 71 of each of the ridge groups 50, 60, and 70 appear to be in front of the second sections 52, 62, and 72, each of the ridge groups 50, 60, and 70 appear to be three-dimensional, and the decorative portion 2 can be made even more noticeable. Also, in this embodiment, a configuration is described in which three of the ridge groups 50, 60, and 70 were provided, but it is also possible to provide four or more of the ridge groups.

Figure 6:
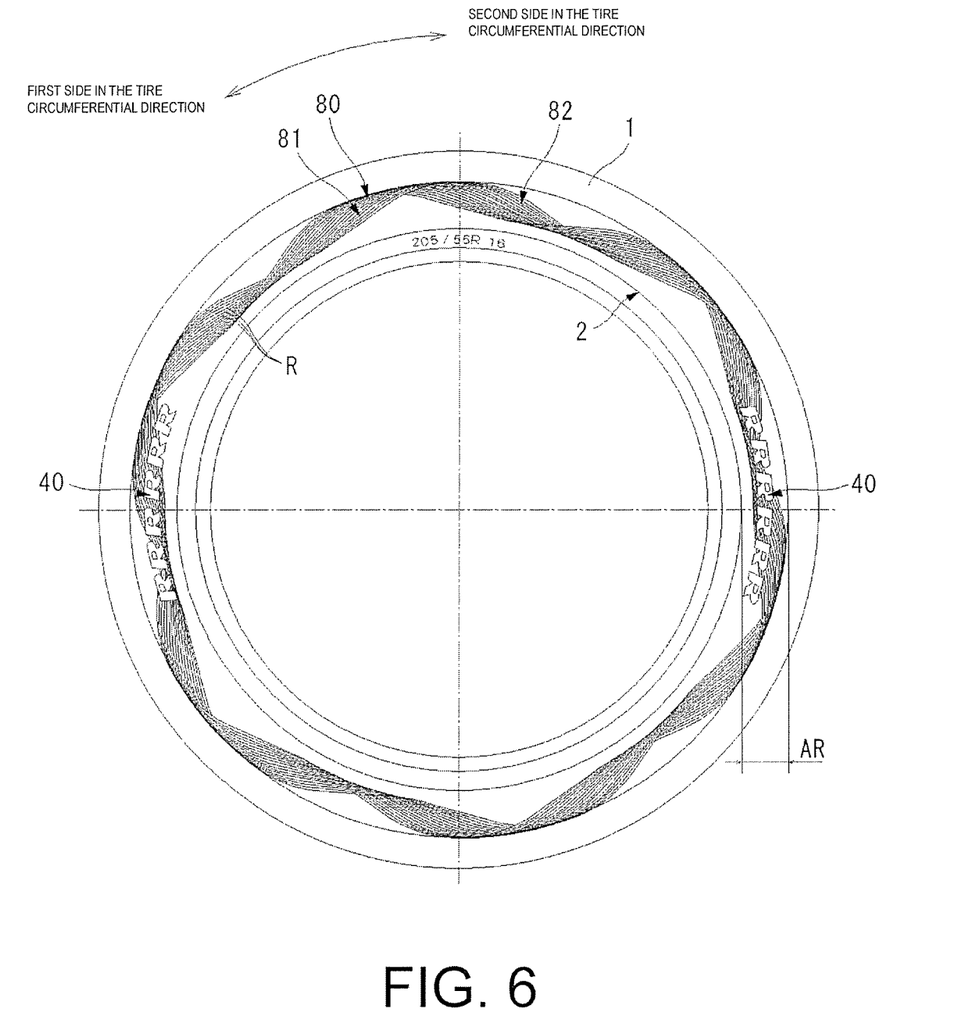
FIG. 6 is a front view of a pneumatic tire according to a third disclosed embodiment.

A pneumatic tire according to a third embodiment will be described below with reference to FIG. 6. This pneumatic tire is a pneumatic tire wherein the configuration of the decorative portion 2 of the first embodiment is modified. The decorative portion 2 of the second embodiment is provided with a ridge group 80 including a bundle of a plurality of ridges. Though not shown in the drawings, a plurality of radial direction ridges that each extend in the tire radial direction is provided in each portion other than the ridge group 80 in the decorative portion 2. Moreover, a display portion 40 where marks are displayed via letters/numbers and/or emblems is provided in two locations in the circumferential direction, and the letter/numbers and the like of the display portions 40 are provided so as to protrude from a surface of the side wall 1. Note that recesses and protrusions corresponding with the ridge group 80, the plurality of radial direction ridges, and each of the display portions 40 are provided in a cavity of a vulcanization mold for vulcanization molding the tire. The ridge group 80, the plurality of radial direction ridges, and each of the display portions 40 are molded into an outer surface of the side wall 1 by these recesses and protrusions.

The ridge group 80 is formed from the bundle of the plurality of ridges R (16 ridges in this embodiment). Additionally, a first section 81, wherein the bundle of the plurality of ridges R extends from an inner side to an outer side in a tire radial direction from a first side toward a second side in the tire circumferential direction, and a second section 82, wherein the bundle of the plurality of ridges R extends from the outer side to the inner side in the tire radial direction from the first side toward the second side in the tire circumferential direction, are alternately disposed in the tire circumferential direction, thereby forming the ridge group 80 into a wave-like shape that extends in the tire circumferential direction.

Additionally, in this embodiment, the ridge group 80 has six waves along a circumference of the tire, and each of the waves is shaped mutually the same. Therefore, a wavelength of each of the waves is ⅙ the length of the circumference of the tire.

Moreover, a mutual interval between each of the ridges R that constitute each of the first sections 81 and each of the second sections 82 is formed so as to gradually widen and then narrow from the first side toward the second side in the tire circumferential direction. In this embodiment, the interval between each of the ridge sections 81 and 82 is configured so that an interval of a largest section is 1.2 times or greater than an interval of a smallest section. The larger this multiplier, the more preferable. Note that while it is preferable that this multiplier be 1.2 times or greater, the effects described below are shown even at a multiplier of approximately 1.1 times. Also, the larger this multiplier, the more preferable.

Additionally, the second section 82 is also provided between a ridge R, disposed most to the second side in the tire circumferential direction, of the ridges R of the first section 81 disposed nearest to the second side in the tire circumferential direction with respect to the second section 82; and a ridge R, disposed most to the second side in the tire circumferential direction, of the ridges R of the first section 81 disposed nearest to the first side in the tire circumferential direction with respect to the second section 82.

Thus, according to this embodiment, the decorative portion 2 is provided with the ridge group 80 including the bundle of the plurality of ridges R; the entirety of the ridge group 80 is formed into a wave-like shape that extends in the tire circumferential direction; and the mutual interval between each of the ridges R that constitute the first section 81 and the second section 82 of the ridge group 80 is formed so as to gradually widen and then narrow from the first side toward the second side in the tire circumferential direction. Therefore, when, for example, the ridge group 80 is viewed from the front (the tire axial direction), a visual effect is produced in which portions where the interval is wide between each of the ridges R appear to be in front of portions where the interval is narrow, the ridge group 80 appears to be three-dimensional, and the decorative portion 2 can be made even more noticeable.

Additionally, each of the second sections 82 is provided between a ridge R, disposed most to the second side in the tire circumferential direction, of the ridges R of the first section 81 disposed nearest to the second side in the tire circumferential direction with respect to the second section 82; and a ridge R, disposed most to the second side in the tire circumferential direction, of the ridges R of the first section 81 disposed nearest to the first side in the tire circumferential direction with respect to the second section 82. In addition to this configuration, an entirety of the ridge group 80 is formed into a wave-like shape that extends in the tire circumferential direction. Therefore, a visual effect is produced in which the first section 81 appears to be in front of the second section 82, the ridge group 80 appears to be three-dimensional, and the decorative portion 2 can be made even more noticeable.

Additionally, in the first to third embodiments, a configuration is described in which the plurality of radial direction ridges was provided in a range outside the range where the ridge groups 10, 20, 50, 60, 70, and 80 were provided in the decorative portion 2. However, in the first to third embodiments, it is also possible to provide a plurality of ridges that extend in the tire circumferential direction in a range outside the range where the ridge groups 10, 20, 50, 60, 70, and 80 are provided in the decorative portion 2. It is also possible to provide ridges that have a different shape. Moreover, it is also possible not to provide the ridges in the range outside the range where the ridge groups 10, 20, 50, 60, 70, and 80 are provided.

Also, in the first to third embodiments, the decorative portion 2 is provided along the entire circumference of the tire. However, even in cases where the decorative portion 2 is partially provided, for example, along half or ¼ of the circumference of the tire, it is possible to attain the same functionality/effectiveness as described above by providing the ridge groups 10, 20, 50, 60, 70, and 80 in the decorative portion 2.

Figure 7:
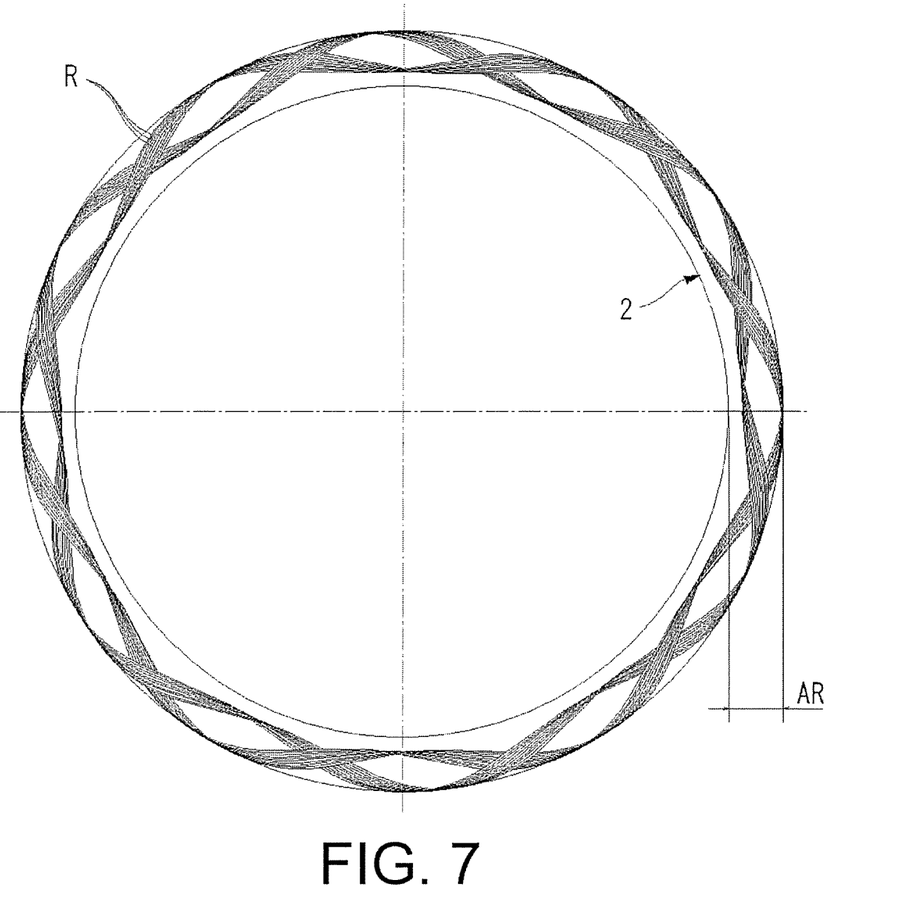
FIG. 7 illustrates a Working Example 1.
Figure 8:
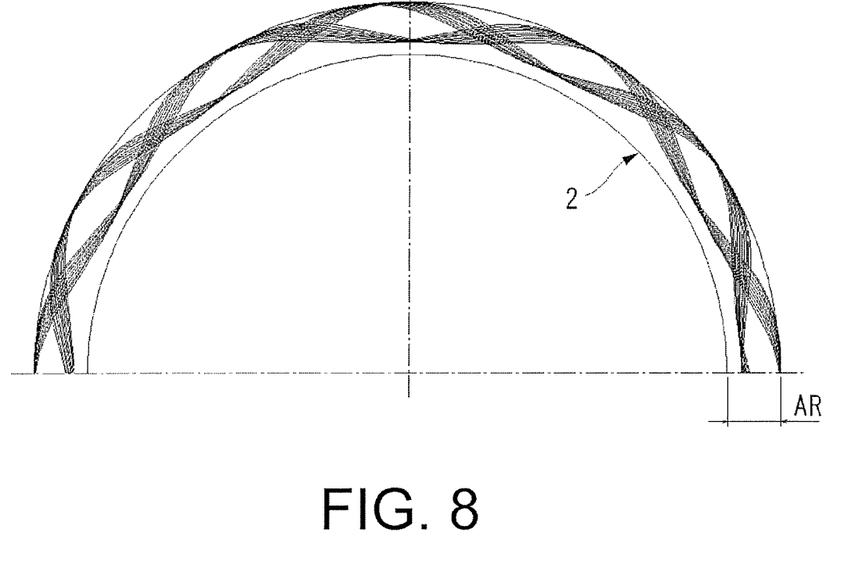
FIG. 8 illustrates a Working Example 2.
Figure 9:
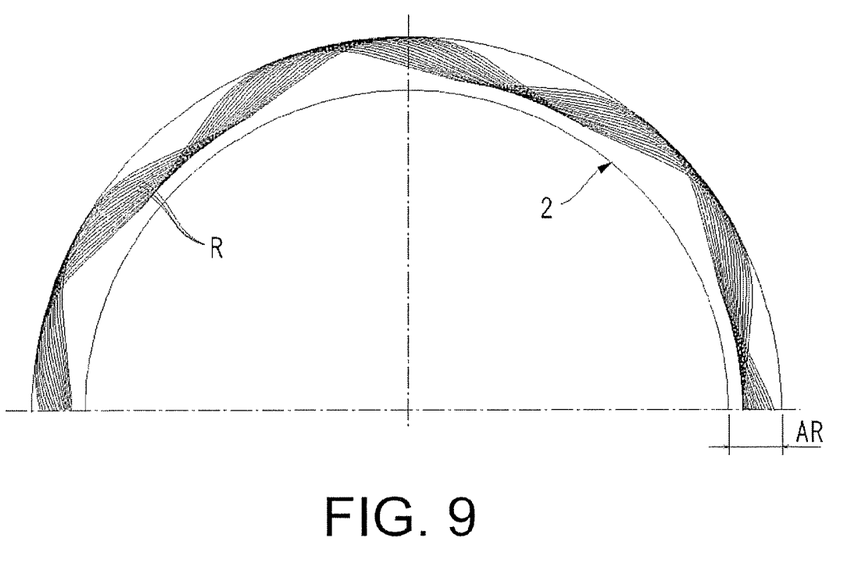
FIG. 9 illustrates a Working Example 3.
Figure 10:
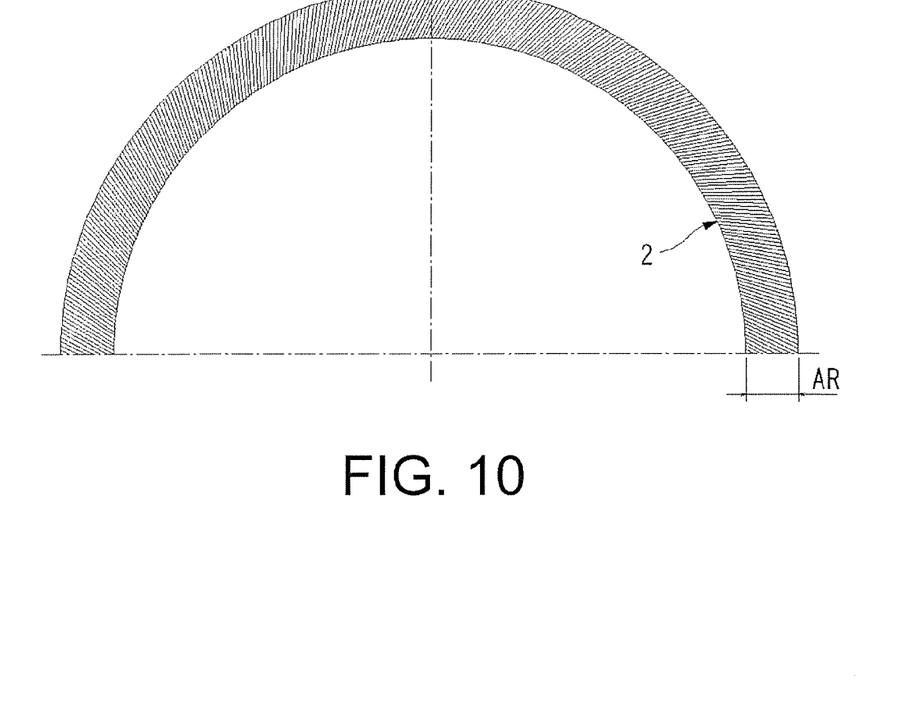
FIG. 10 illustrates a Comparative Example 1.
Figure 11:
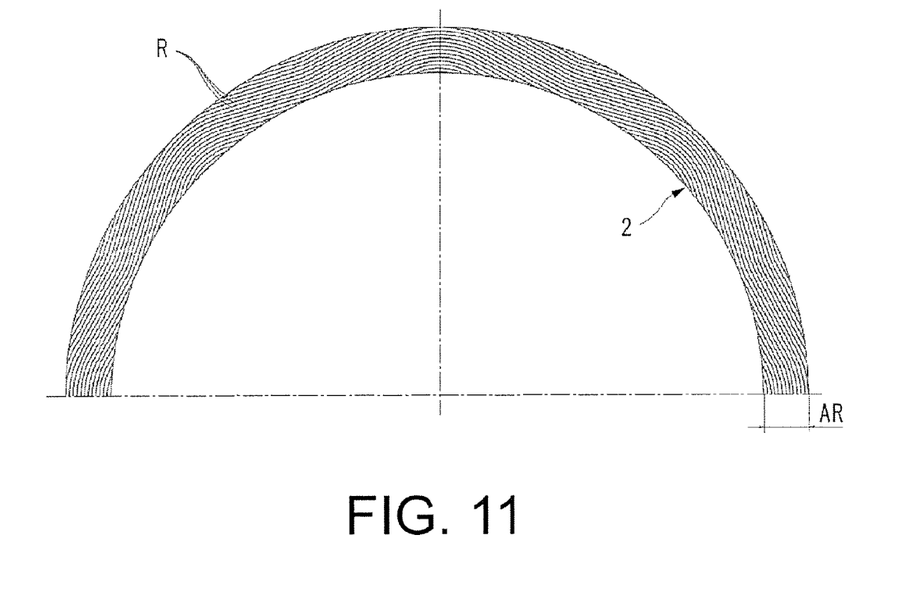
FIG. 11 illustrates a Comparative Example 2.

Samples of the decorative portion 2 such as those illustrated in FIGS. 7 to 11 were fabricated in order to confirm the effectiveness of the ridge groups 10, 20, 50, 60, 70, and 80 described in the first to third embodiments. In the sample of FIG. 7, only the ridge groups 10 and 20 were provided in the decorative portion 2. The radial direction ridges 30 and the display portions 40 of the first embodiment were not provided. In the sample of FIG. 8, the sample of FIG. 7 is used, however the ridges R of the second section 22 of the second ridge group 20 were not divided in an extending direction thereof by the first section 11 of the first ridge group 10, and the ridges R of the second section 12 of the first ridge group 10 were not divided in an extending direction thereof by the first section 21 of the second ridge group 20. In the sample of FIG. 9, only the ridge group 80 was provided in the decorative portion 2. The radial direction ridges and the display portions 40 of the third embodiment were not provided. Additionally, in the sample of FIG. 9, the configuration used in the third embodiment is not used in which each of the second sections 82 is provided between the ridge R, disposed most to the second side in the tire circumferential direction, of the ridges R of the first section 81 disposed nearest to the second side in the tire circumferential direction with respect to the second section 82; and the ridge R, disposed most to the second side in the tire circumferential direction, of the ridges R of the first section 81 disposed nearest to the first side in the tire circumferential direction with respect to the second section 82. In other words, each of the ridges of the second section 82 cross each of the ridges of the first section 81 at one end or another end thereof. In the sample of FIG. 10, each of the plurality of ridges R is provided in the decorative portion 2 so as to extend in the tire radial direction, and each of the ridges R is disposed so as to be arranged mutually substantially parallel with an adjacent ridge R. In the sample of FIG. 11, each of the plurality of ridges R formed into a wave-like shape in the tire circumferential direction is disposed so as to be arranged mutually substantially parallel.

Figure 12:
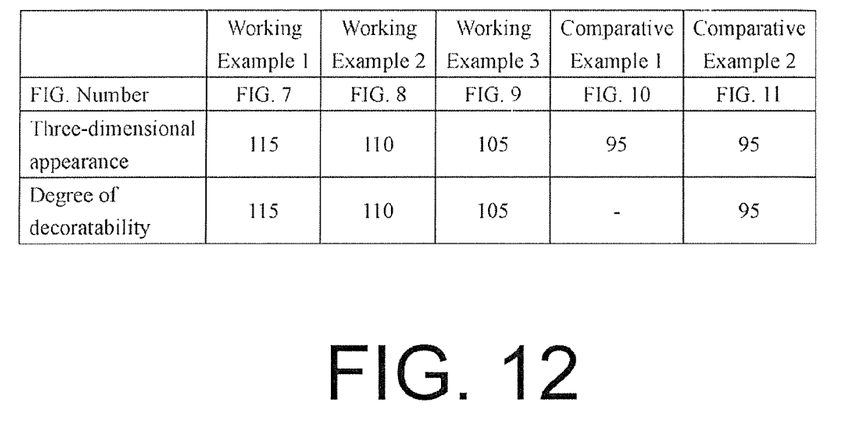
FIG. 12 is a table showing an example of evaluation results.

The samples of FIGS. 7 to 11 were observed by 30 people and an evaluation was made as to whether a design formed from the ridges R provided in the decorative portion 2 appeared three-dimensional or not. Additionally, an evaluation of a degree of the decoratability of the design formed from the ridges R provided in the decorative portion 2 was performed. These evaluations were indexed and recorded in FIG. 12. The evaluation as to whether the design appeared three-dimensional or not was performed as follows: When more than 70% of all of the people evaluated the design to be three-dimensional, a score of 105 was given; when more than 85% of all of the people evaluated the design to be three-dimensional, a score of 110 was given; when more than 95% of all of the people evaluated the design to be three-dimensional, a score of 115 was given; when more than 30% of the people evaluated the design to be three-dimensional, a score of 100 was given; when 30% or less of the people evaluated the design to be three-dimensional, a score of 95 was given; and when 0% of the people evaluated the design to be three-dimensional, a score of 90 was given.

The evaluation of the degree of decoratability was performed as follows: Compared to the case illustrated in FIG. 10, when more than 50% of all of the people evaluated the degree of decoratability to be extremely high, a score of 105 was given; when more than 75% of all of the people evaluated the degree of decoratability to be extremely high, a score of 110 was given; when more than 90% of all of the people evaluated the degree of decoratability to be extremely high, a score of 115 was given; when more than 30% of the people evaluated the degree of decoratability to be extremely high, a score of 100 was given; when 30% or less of the people evaluated the degree of decoratability to be extremely high, a score of 95 was given; and when 0% of the people evaluated the degree of decoratability to be extremely high, a score of 90 was given.

It was determined from the evaluation results that for each of Working Examples 1 to 3 the design formed from the ridges R was evaluated to appear more three-dimensional and have a higher degree of decoratability than Comparative Examples 1 and 2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a tread portion extending in a tire circumferential direction and forming a ring shape; and
a pair of sidewall portions disposed on both sides of the tread portion, respectively, with regard to a tire width direction, one of the sidewall portions having an outer surface including a decorative portion extending in the tire circumferential direction, the decorative portion including a first ridge group;
the first ridge group including a first bundle of ridges arranged in a plurality of respective first sections and a plurality of respective second sections, such that each of the respective first sections extends from a respective first location at a respective first radial distance of the pneumatic tire to a respective second location at a respective second radial distance of the pneumatic tire greater than the respective first radial distance, and each of the respective second sections extends from a respective one of the second locations to a respective one of the first locations, with all of the first and second locations being separated in the tire circumferential direction such that the first ridge group extends in a first wave pattern along the tire circumferential direction:
each of the first sections having narrow portions proximate to the respective first and second locations and a wide portion at a location between the respective first and second locations; and
each of the second sections having narrow portions proximate to the respective first and second locations and a wide portion at a location between the respective first and second locations.

2. The pneumatic tire according to claim 1, wherein each of the second sections extends between a ridge of an adjacent respective first section that is located most outwardly in the radial direction and a ridge of another adjacent respective first section that is located most inwardly in the radial direction.

3. The pneumatic tire according to claim 1, wherein the decorative portion further includes a second ridge group, the second ridge group including a second bundle of ridges arranged in a plurality of respective third sections and a plurality of respective fourth sections, such that each of the respective third sections extends from a respective third location at a respective third radial distance of the pneumatic tire to a respective fourth location at a respective fourth radial distance of the pneumatic tire greater than the respective third radial distance, and each of the respective fourth sections extends from a respective one of the fourth locations to a respective one of the third locations, with all of the third and fourth locations being separated in the tire circumferential direction such that the second ridge group extends in a second wave pattern along the tire circumferential direction; and
the first and second ridge groups being configured to cross at a plurality of cross locations along the tire circumferential direction such that each respective first section crosses a respective fourth section at a respective first cross location and each respective second section crosses a respective third section at a respective second cross location.

4. The pneumatic tire according to claim 3, wherein each of the first and second sections has narrow portions proximate to the respective first and second locations and a wide portion at a location between the respective first and second locations; and each of the third and fourth sections has narrow portions proximate to the respective third and fourth locations and a wide portion at a location between the respective third and fourth locations.

5. The pneumatic tire according to claim 3, wherein each respective first section divides a respective fourth section along an extending direction at a respective cross location.

6. The pneumatic tire according to claim 3, wherein each respective third section divides a respective second section along an extending direction at a respective cross location.

7. The pneumatic tire according to claim 3, wherein at least one of the third sections has a wide portion that is wider than other of the third sections and at least one of the fourth sections has a wide portion that is wider than other of the fourth sections.

8. The pneumatic tire according to claim 7, wherein the wide portion of the at least one of the third sections crosses one of the second sections and the wide portion of the at least one of the fourth sections crosses one of the first sections.

9. The pneumatic tire according to claim 3, wherein the decorative portion further includes a third ridge group, the third ridge group including a third bundle of ridges arranged in a plurality of respective fifth sections and a plurality of respective sixth sections, such that each of the respective fifth sections extends from a respective fifth location at a respective fifth radial distance of the pneumatic tire to a respective sixth location at a respective sixth radial distance of the pneumatic tire greater than the respective fifth radial distance, and each of the respective sixth sections extends from a respective one of the sixth locations to a respective one of the fifth locations, with all of the fifth and sixth locations being separated in the tire circumferential direction such that the third ridge group extends in a third wave pattern along the tire circumferential direction; and
the third ridge group being configured to cross the first ridge group at a plurality of third cross locations along the tire circumferential direction and to cross the second ridge group at a plurality of fourth cross locations along the circumferential direction.

10. The pneumatic tire according to claim 9, wherein each of the fifth and sixth sections has narrow portions proximate to the respective fifth and sixth locations and a wide portion at a location between the respective fifth and sixth locations.

11. The pneumatic tire according to claim 9, wherein each respective fifth section divides one of a respective first section, second section, third section and fourth section along an extending direction at a respective cross location.

12. The pneumatic tire according to claim 9, wherein each respective sixth section divides one of a respective first section, second section, third section and fourth section along an extending direction at a respective cross location.

13. The pneumatic tire according to claim 9, wherein at least one fifth section is configured to cross a respective second section and a respective fourth section.

14. The pneumatic tire according to claim 9, wherein at least one sixth section is configured to cross a respective first section and a respective third section.

15. The pneumatic tire according to claim 9, wherein the first, second and third ridge groups each have an equal wavelength in the tire circumferential direction that is 1/6 of a circumference of the tire.

16. The pneumatic tire according to claim 15, wherein the third ridge group is offset in the tire circumferential direction from the first ridge group by 1/3 of the wavelength of the first ridge group.

17. The pneumatic tire according to claim 3, wherein the first and second ridge groups each have an equal wavelength in the tire circumferential direction, and the first and second ridge groups are disposed so as to be mutually offset in the tire circumferential direction not less than 1/12 of the wavelength and not more than 5/12 of the wavelength.

* * * * *